United States Patent
Robertson, Jr. et al.

(10) Patent No.: US 11,921,208 B2
(45) Date of Patent: Mar. 5, 2024

(54) SENSOR APPARATUS WITH CLEANING

(71) Applicant: Ford Global Technologies, LLC, Dearborn, MI (US)

(72) Inventors: Michael Robertson, Jr., Garden City, MI (US); Raghuraman Surineedi, Dearborn, MI (US); Venkatesh Krishnan, Canton, MI (US); Tyler D. Hamilton, Farmington, MI (US); Kunal Singh, Farmington Hills, MI (US); Shibu Koyadan Chathoth, Clawson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 849 days.

(21) Appl. No.: 17/004,316

(22) Filed: Aug. 27, 2020

(65) Prior Publication Data
US 2022/0066031 A1    Mar. 3, 2022

(51) Int. Cl.
| | |
|---|---|
| *G01S 7/481* | (2006.01) |
| *B08B 5/02* | (2006.01) |
| *B60R 11/04* | (2006.01) |
| *B60S 1/52* | (2006.01) |
| *B60S 1/56* | (2006.01) |
| *G01S 17/10* | (2020.01) |
| *G01S 17/931* | (2020.01) |

(Continued)

(52) U.S. Cl.
CPC ............... *G01S 17/10* (2013.01); *B08B 5/02* (2013.01); *G01S 7/4813* (2013.01); *G01S 7/4814* (2013.01); *G01S 17/931* (2020.01); *B60R 2011/004* (2013.01); *B60R 2011/0064* (2013.01); *B60R 11/04* (2013.01); *B60S 1/52* (2013.01); *B60S 1/56* (2013.01); *G02B 27/0006* (2013.01)

(58) Field of Classification Search
CPC .................................................. G02B 27/0006
See application file for complete search history.

(56) References Cited

U.S. PATENT DOCUMENTS

| | | | | |
|---|---|---|---|---|
| 4,520,961 A | * | 6/1985 | Hueber ..................... | B60S 1/52 239/284.1 |
| 5,657,929 A | * | 8/1997 | DeWitt ..................... | B60S 1/54 239/284.2 |

(Continued)

FOREIGN PATENT DOCUMENTS

| | | | |
|---|---|---|---|
| DE | 19500349 A1 | * 7/1996 | .............. B60S 1/486 |
| DE | 102019218610 A1 | * 6/2021 | |

*Primary Examiner* — Spencer E. Bell
*Assistant Examiner* — Omair Chaudhri
(74) *Attorney, Agent, or Firm* — Frank A. MacKenzie; Bejin Bieneman PLC

(57) ABSTRACT

A sensor apparatus includes a first sensing device, a sensor housing, a bracket, a second sensor, and a channel plate. The sensor housing includes a first sensor window and a top panel, and the first sensing device has a field of view through the first sensor window. The bracket is mounted on top of the top plate. The second sensor is held by the bracket and includes a second sensor window. The channel plate is fixed to the bracket. The bracket includes a first nozzle aimed at the first sensor window and a second nozzle aimed at the second sensor window. The bracket includes a channel fluidly connected to the first nozzle and the second nozzle. The channel plate covers the channel.

19 Claims, 6 Drawing Sheets

(51) Int. Cl.
*G02B 27/00* (2006.01)
*B60R 11/00* (2006.01)

(56) References Cited

U.S. PATENT DOCUMENTS

| | | | | |
|---|---|---|---|---|
| 6,360,969 | B1* | 3/2002 | Egner-Walter | B05B 1/323 |
| | | | | 239/533.13 |
| 2002/0005440 | A1* | 1/2002 | Holt | B05B 15/652 |
| | | | | 239/284.2 |
| 2006/0054224 | A1* | 3/2006 | Lasebnick | B60S 1/526 |
| | | | | 137/625.48 |
| 2007/0018013 | A1* | 1/2007 | Lasebnick | B60S 1/52 |
| | | | | 264/318 |
| 2009/0014555 | A1* | 1/2009 | Litvinov | B05B 1/3447 |
| | | | | 239/284.2 |
| 2011/0266375 | A1* | 11/2011 | Ono | B60S 1/0848 |
| | | | | 239/589 |
| 2014/0367487 | A1* | 12/2014 | Oestergren | B05B 1/488 |
| | | | | 239/284.1 |
| 2015/0183406 | A1* | 7/2015 | Tanaka | B08B 3/02 |
| | | | | 134/99.1 |
| 2016/0244028 | A1* | 8/2016 | Wakatsuki | B60S 1/566 |
| 2017/0036647 | A1* | 2/2017 | Zhao | G02B 27/0006 |
| 2017/0166170 | A1* | 6/2017 | Park | B05B 15/52 |
| 2017/0313286 | A1* | 11/2017 | Galera | B08B 3/02 |
| 2018/0015908 | A1* | 1/2018 | Rice | B60S 1/56 |
| 2018/0079392 | A1* | 3/2018 | Karasik | G02B 27/0006 |
| 2019/0054855 | A1* | 2/2019 | Krishnan | B60Q 1/2661 |
| 2019/0184942 | A1* | 6/2019 | Vaishnav | B08B 1/04 |
| 2019/0314865 | A1* | 10/2019 | Sevak | G02B 27/0006 |
| 2019/0384313 | A1* | 12/2019 | Toth | H04N 23/698 |
| 2020/0061643 | A1* | 2/2020 | Rachow | B05B 1/14 |
| 2020/0114877 | A1* | 4/2020 | Hu | B60S 1/0411 |
| 2020/0180567 | A1* | 6/2020 | Sakai | B60S 1/52 |
| 2020/0254464 | A1* | 8/2020 | Romack | B29C 64/112 |
| 2020/0331438 | A1* | 10/2020 | Matsushita | F04B 35/04 |
| 2021/0009088 | A1* | 1/2021 | Hayashi | B08B 13/00 |
| 2021/0170995 | A1* | 6/2021 | Zhuang | G03B 17/02 |
| 2021/0179030 | A1* | 6/2021 | Sakai | B60S 1/56 |
| 2021/0179032 | A1* | 6/2021 | Vitanov | B08B 3/02 |
| 2021/0293932 | A1* | 9/2021 | Bruce-Wen | G01S 17/08 |
| 2021/0309186 | A1* | 10/2021 | Rice | G01S 17/931 |
| 2021/0339710 | A1* | 11/2021 | Adams | B08B 3/02 |
| 2022/0009453 | A1* | 1/2022 | Rachow | B05B 3/0427 |
| 2022/0032878 | A1* | 2/2022 | Shawgo | B60S 1/48 |
| 2022/0126790 | A1* | 4/2022 | Matsunaga | B60S 1/54 |
| 2022/0132004 | A1* | 4/2022 | Kanitz | G01S 17/87 |
| 2023/0031726 | A1* | 2/2023 | Kubota | G03B 30/00 |
| 2023/0089733 | A1* | 3/2023 | Avram | G01S 13/867 |
| | | | | 701/28 |
| 2023/0132583 | A1* | 5/2023 | Matsunaga | B05B 1/046 |
| | | | | 239/598 |

* cited by examiner

SENSOR APPARATUS WITH CLEANING

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
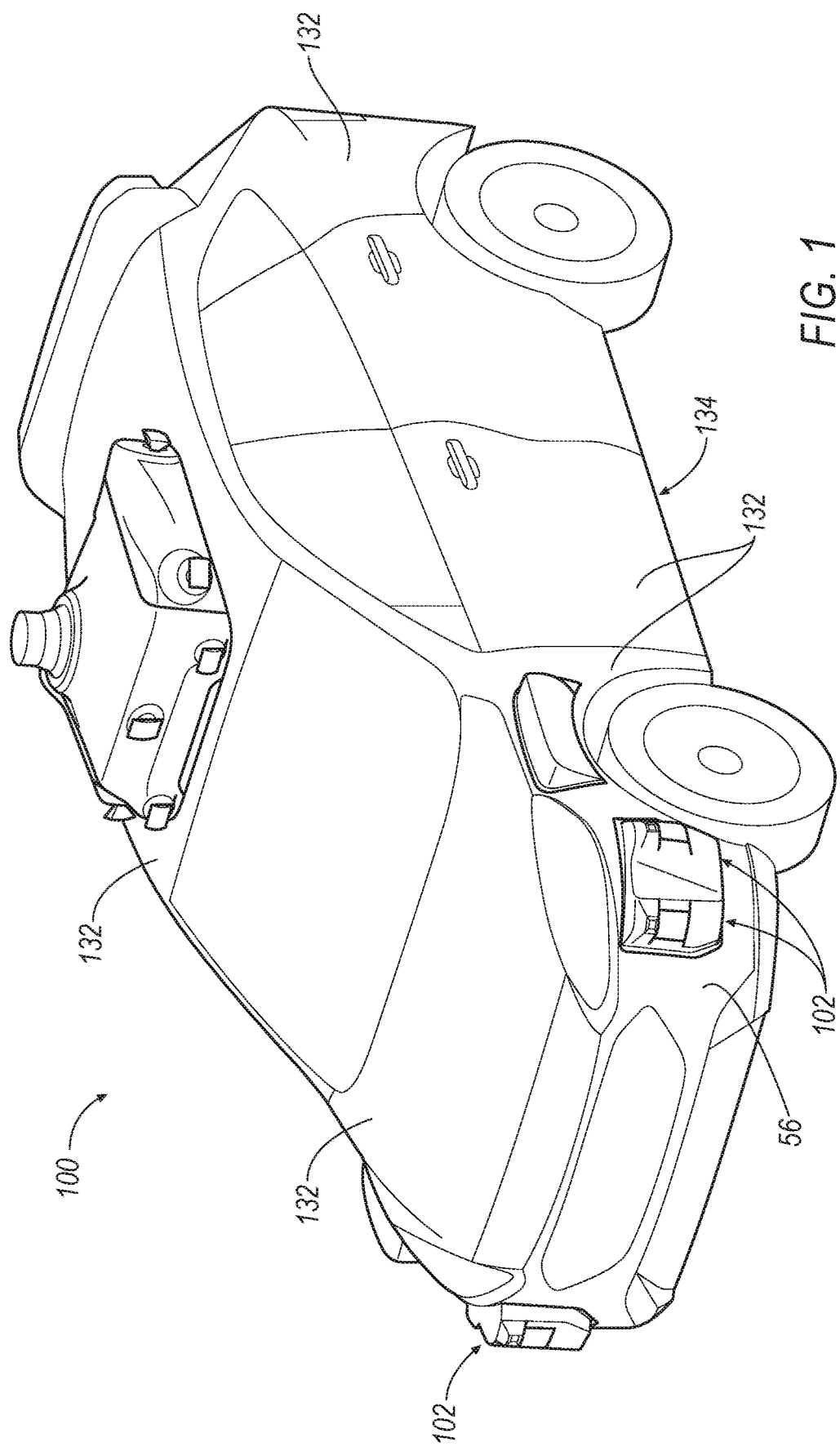
FIG. 1 is a perspective view of an example vehicle including a plurality of sensor apparatuses.

A sensor apparatus includes a first sensing device; sensor housing, wherein the sensor housing includes a first sensor window and a top panel, and the first sensing device has a field of view through the first sensor window; a bracket mounted on top of the top panel; a second sensor held by the bracket and including a second sensor window; and a channel plate fixed to the bracket. The bracket includes a first nozzle aimed at the first sensor window and a second nozzle aimed at the second sensor window. The bracket includes a channel fluidly connected to the first nozzle and the second nozzle, and the channel plate covers the channel.

The channel plate may include an inlet fluidly connected to the channel. The inlet may be aligned with the second nozzle.

The sensor apparatus may further include a third sensing device, the sensor housing may include a third sensor window, and the third sensing device may have a field of view through the third sensor window. The bracket may include a third nozzle aimed at the third sensor window, and the channel may be fluidly connected to the third nozzle. The channel plate may include an inlet fluidly connected to the channel, and the channel may be sealed except for the inlet, the first nozzle, the second nozzle, and the third nozzle.

The channel may be elongated from the first nozzle to the second nozzle and from the second nozzle to the third nozzle.

The bracket may be a single piece.

The first nozzle may include a first orifice and a second orifice. The first orifice may be shaped to discharge onto a first region of the first sensor window, and the second orifice may be shaped to discharge onto a second region of the first sensor window.

The first nozzle may include a cylindrical section including the first orifice and second orifice, and the cylindrical section defines an axis. The first orifice may have a direction of discharge forming an acute angle with the axis in a direction along the axis toward the first sensor window. The acute angle may be a first acute angle, and the second orifice may have a direction of discharge forming a second acute angle with the axis in a direction along the axis toward the first sensor window. The first acute angle may be greater than the second acute angle. The first orifice may be spaced from the second orifice along the axis, and the first orifice may be farther from the first sensor window along the axis than the second orifice is.

The first sensor window may have a rectangular shape, and the axis may be transverse to a plane defined by the rectangular shape of the first sensor window.

The sensor apparatus may further include a face plate including a clip, and the bracket may include a slot into which the clip is inserted. The face plate may include openings through which the second sensor, first nozzle, and second nozzle extend.

The first sensing device may be a LIDAR sensing device.

The second sensor may be a camera, and the second sensor window may be a lens.

With reference to the Figures, a sensor apparatus 102 for a vehicle 100 includes a first sensing device 104, a sensor housing 106, a bracket 108, a second sensor 110, and a channel plate 112. The sensor housing 106 includes a first sensor window 114 and a top panel 116, and the first sensing device 104 has a field of view through the first sensor window 114. The bracket 108 is mounted on top of the top panel 116. The second sensor 110 is held by the bracket 108 and includes a second sensor window 118. The channel plate 112 is fixed to the bracket 108. The bracket 108 includes a first nozzle 120 aimed at the first sensor window 114 and a second nozzle 122 aimed at the second sensor window 118. The bracket 108 includes a channel 124 fluidly connected to the first nozzle 120 and the second nozzle 122. The channel plate 112 covers the channel 124.

The sensor apparatus 102 can provide an efficiently packaged collection of the first sensing device 104, the second sensor 110, and a third sensing device 126 along with a combined cleaning apparatus for the first sensor window 114, the second sensor window 118, and a third sensor window 128 of the third sensing device 126. The integration of the first nozzle 120, the second nozzle 122, and a third nozzle 130 for the third sensor window 128 with the bracket 108 and of the channel 124 with the bracket 108 provides a low dimensional stackup and can be supplied with fluid using a small number of components. The sensor apparatus 102 can thus provide a low complexity, a small number of components, and a small volume occupied, i.e., small package size. The sensor apparatus 102 provides an interchangeable design that can be located in multiple locations on the vehicle 100.

With reference to FIG. 1, the vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input, e.g., based on data received from the first sensing device 104, the second sensor 110, and the third sensing device 126.

The vehicle 100 includes a body 132. The vehicle 100 may be of a unibody construction, in which a frame and the body 132 of the vehicle 100 are a single component. The vehicle 100 may, alternatively, be of a body-on-frame construction, in which the frame supports the body 132 that is a separate component from the frame. The frame and body 132 may be formed of any suitable material, for example, steel, aluminum, etc. The body 132 includes body panels 134 partially defining an exterior of the vehicle 100. The body panels 134 may present a class-A surface, e.g., a finished surface exposed to view by a customer and free of unaesthetic blemishes and defects.

The sensor apparatus 102 is disposed on and mounted to one of the body panels 134. For example, the sensor apparatus 102 can be disposed on a front end of the vehicle 100 below a beltline of the vehicle 100, as shown in FIG. 1. While the discussion below is with respect to a single sensor apparatus 102, the vehicle 100 can include multiple sensor apparatuses 102, each disposed on one of the body panels 134. The sensor apparatuses 102 can be arranged to provide the first sensing devices 104, second sensors 110, and third sensing devices 126 with a collective field of view entirely around a front end of the vehicle 100.

Figure 2:
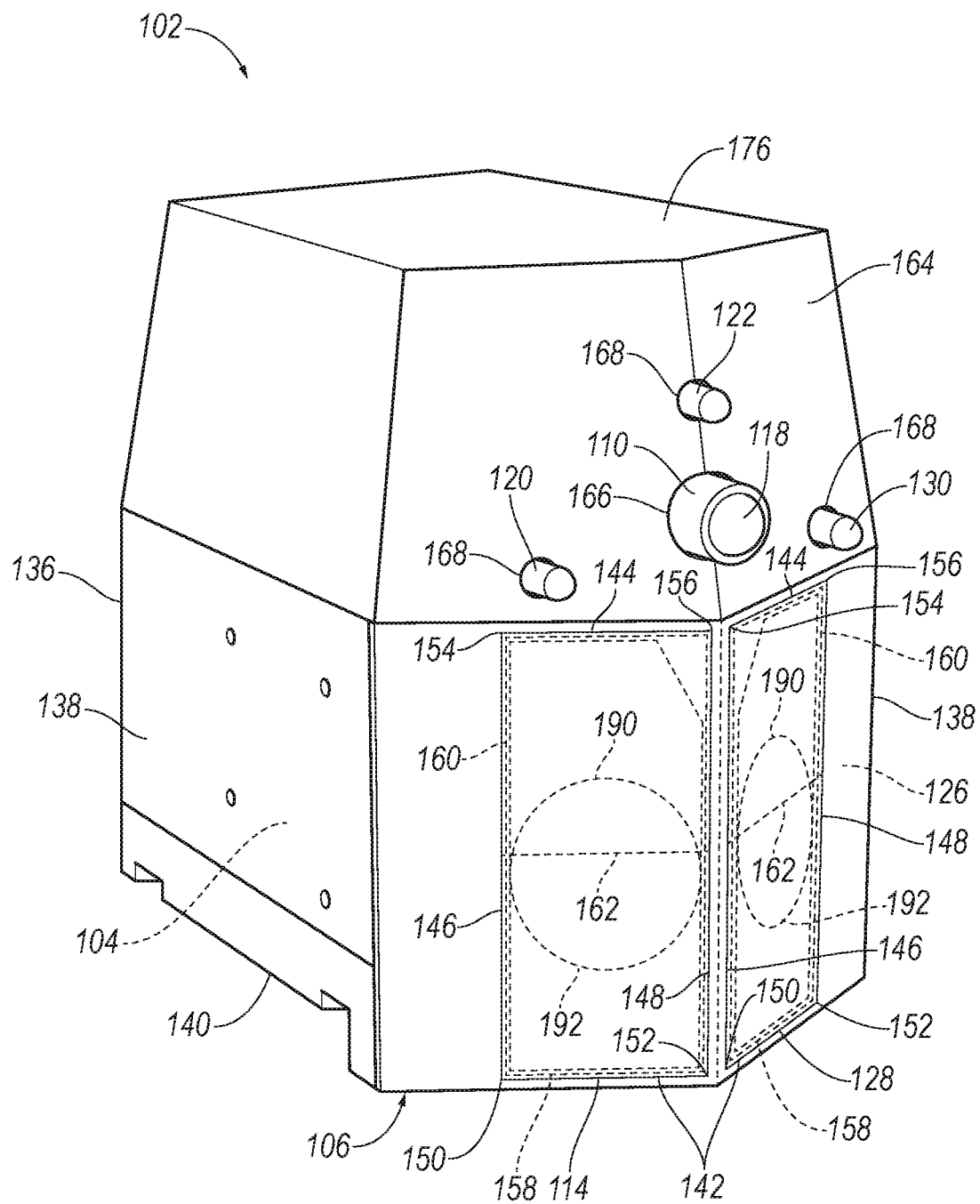
FIG. 2 is a perspective view of one of the sensor apparatuses.
Figure 3:
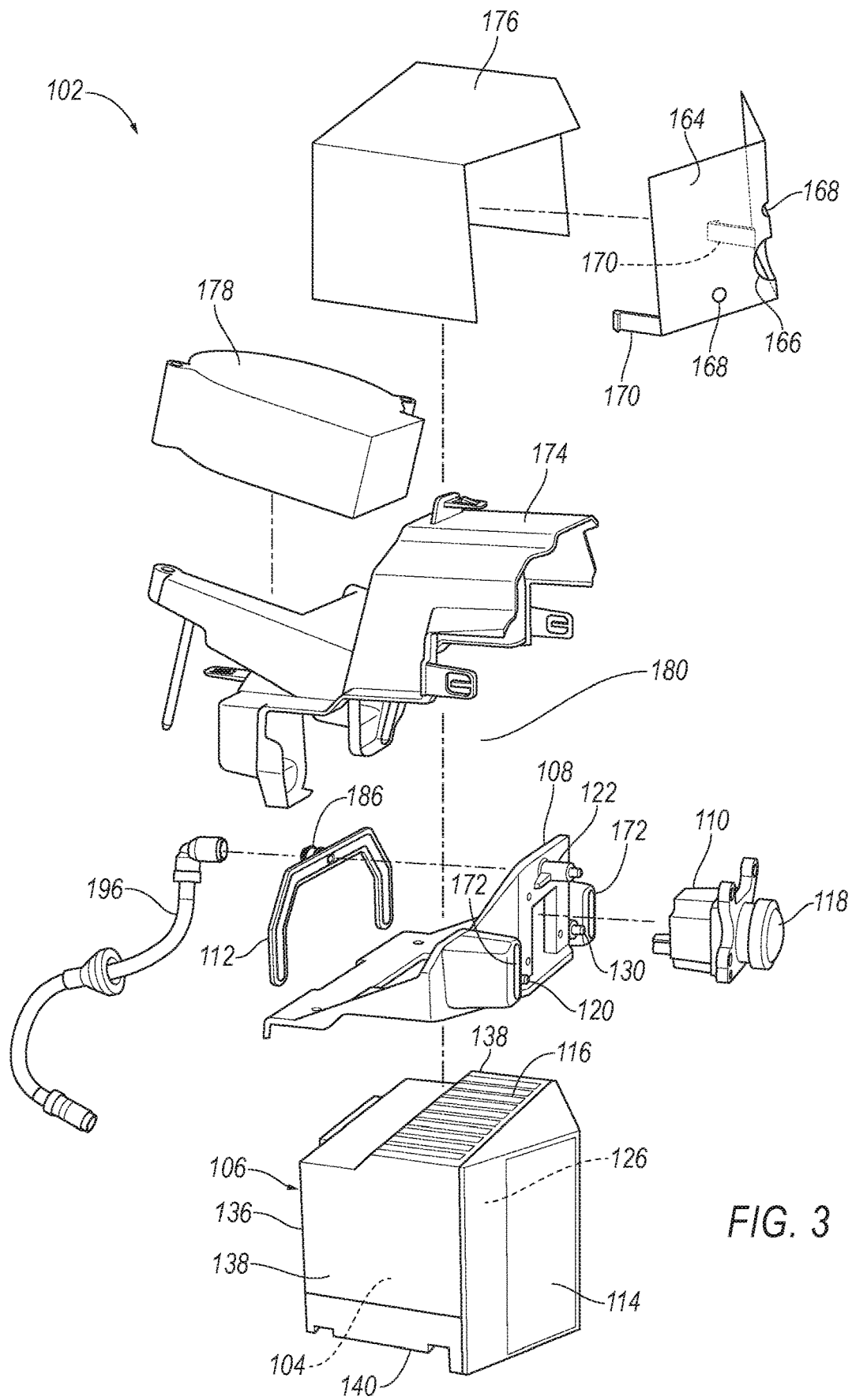
FIG. 3 is an exploded view of the sensor apparatus of FIG. 2.

With reference to FIGS. 2 and 3, the sensor apparatus 102 includes the sensor housing 106 for the first sensing device 104 and the third sensing device 126. The sensor housing 106 includes the top panel 116, a back panel 136, two side panels 138, a bottom panel 140, the first sensor window 114, and the third sensor window 128. The back panel 136, the side panels 138, the first sensor window 114, and the third sensor window 128 extend vertically from the bottom panel 140 to the top panel 116. The first sensor window 114 and third sensor window 128 face away from the vehicle 100, i.e., away from the body panel 134 to which the sensor apparatus 102 is mounted. The back panel 136 faces toward the vehicle 100, i.e., toward the body panel 134 to which the sensor apparatus 102 is mounted. The first sensor window 114 and third sensor window 128 are on an opposite side of the sensor housing 106 from the body panel 134 to which the sensor apparatus 102 is mounted. The side panels 138 extend from the back panel 136 to the first sensor window 114 and third sensor window 128. The back panel 136 extends from one of the side panels 138 to the other of the side panels 138. The bottom panel 140 and the top panel 116 are parallel to each other.

The first sensing device 104 and the third sensing device 126 are disposed inside the sensor housing 106. The first sensing device 104 and the third sensing device 126 can each be a LIDAR device. A LIDAR device detects distances to objects by emitting laser pulses at a particular wavelength and measuring the time of flight for the pulse to travel to the object and back. The first sensing device 104 and the third sensing device 126 each include components for emitting and detecting the pulses. The first sensing device 104 has a field of view through the first sensor window 114, and the third sensing device 126 has a field of view through the third sensor window 128.

The first sensor window 114 is transparent with respect to wavelengths of light that the first sensing device 104 is capable of emitting and/or detecting. The third sensor window 128 is transparent with respect to wavelengths of light that the third sensing device 126 is capable of emitting and/or detecting.

The first sensor window 114 and the third sensor window 128 are fixed relative to the rest of the sensor housing 106 and relative to each other. The first sensor window 114 has a flat rectangular shape and defines a plane. The third sensor window 128 has a flat rectangular shape and defines a different plane than the plane defined by the first sensor window 114. An angle defined by the first sensor window 114 and the third sensor window 128, i.e., an angle at which the portions of the planes defined by the first sensor window 114 and third sensor window 128 intersect, is obtuse.

The first sensor window 114 and third sensor window 128 each include a first short edge 142, a second short edge 144, a first long edge 146, a second long edge 148, a first corner 150, a second corner 152, a third corner 154, and a fourth corner 156 defined by the rectangular shape. The first short edge 142 and second short edge 144 extend horizontally, and the first long edge 146 and second long edge 148 extend vertically. The second short edge 144 is closer to the respective first nozzle 120 or third nozzle 130 than the first short edge 142 is. The second short edge 144 connects the first corner 150 and the second corner 152. The first sensor window 114 and third sensor window 128 can each be divided into a first half 158 and a second half 160, and the first half 158 and the second half 160 encompass all of the respective first sensor window 114 or third sensor window 128 and are nonoverlapping. The first half 158 is a lower half and extends from a horizontal midline 162 of the respective first sensor window 114 or third sensor window 128 to the first short edge 142 and from the first long edge 146 to the second long edge 148. The second half 160 is an upper half and extends from the horizontal midline 162 of the respective first sensor window 114 or third sensor window 128 to the second short edge 144 and from the first long edge 146 to the second long edge 148. The first half 158 is farther from the respective first nozzle 120 or third nozzle 130 than the second half 160 is.

With reference to FIG. 3, the bracket 108 is mounted on top of the top panel 116, e.g., bolted to the top panel 116, and is thereby fixed relative to the sensor housing 106. The bracket 108 is a single piece, i.e., made of a single, uniform piece of material with no seams, joints, fasteners, or adhesives holding it together.

The bracket 108 holds the second sensor 110. For example, the second sensor 110 can be press-fit into an opening through the bracket 108. The bracket 108 fixes the position of the second sensor 110 relative to the sensor housing 106.

The second sensor 110 detects the external world, e.g., objects and/or characteristics of surroundings of the vehicle 100, such as other vehicles, road lane markings, traffic lights and/or signs, pedestrians, etc. For example, the second sensor 110 can be a radar sensor, a scanning laser range finder, a light detection and ranging (LIDAR) device, or an image processing sensor such as a camera. In particular, the second sensor 110 can be a camera.

The second sensor 110 includes the second sensor window 118. The second sensor window 118 faces outward through a face plate 164, i.e., the second sensor window 118 is aimed through the face plate 164, e.g., through a sensor opening 166 in the face plate 164. The second sensor window 118 can be, e.g., a camera lens.

The sensor apparatus 102 includes the face plate 164. The face plate 164 is fixed relative to the bracket 108. For example, the face plate 164 can include one or more clips 170, e.g., two clips 170 as shown in FIG. 3, and the bracket 108 can include one or more slots 172 into which the respective clips 170 are inserted. The face plate 164 faces away from the vehicle 100, i.e., away from the body panel 134 to which the sensor apparatus 102 is mounted. The face plate 164 covers a front side of the bracket 108. The face plate 164 includes the sensor opening 166 through which the second sensor 110 extends and includes nozzle openings 168 through which the first nozzle 120, second nozzle 122, and third nozzle 130 extend.

The sensor apparatus 102 includes an internal cover 174, a top cover 176, and a blower 178. The internal cover 174 attaches, e.g., by a snap-fit, to the bracket 108, and the internal cover 174, bracket 108, and top panel 116 can form a chamber 180 in which the second sensor 110 is disposed. The blower 178 is mounted to the internal cover 174 and is positioned to blow into the chamber 180, which can help cool the second sensor 110 and sensor housing 106. The top cover 176 and the face plate 164 enclose the bracket 108, the internal cover 174, the second sensor 110, and the blower 178.

Figure 4:
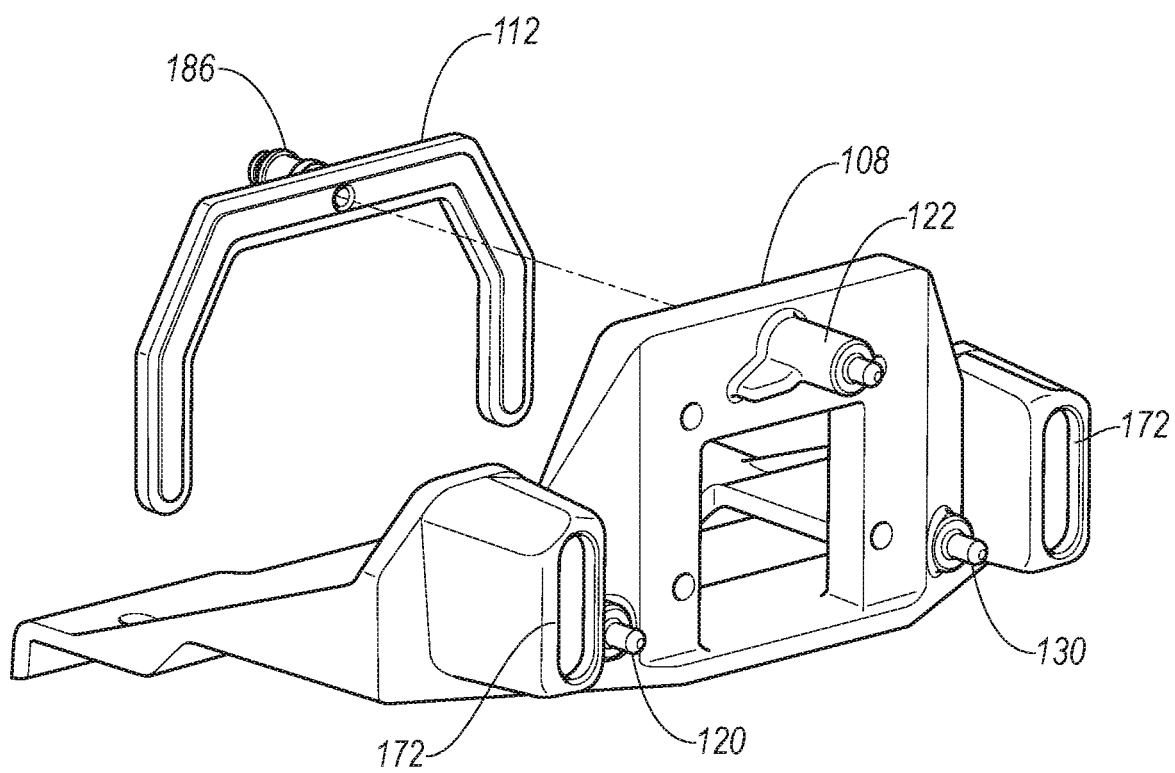
FIG. 4 is a perspective exploded view of a bracket and a channel plate of the sensor apparatus.

With reference to FIG. 4, the bracket 108 includes the first nozzle 120, the second nozzle 122, and the third nozzle 130. The second nozzle 122 is aimed at the second sensor window 118. As described in more detail below, the first nozzle 120 and third nozzle 130 each include a first orifice 182 and second orifice 184 both aimed at the respective first sensor window 114 or third sensor window 128. The first nozzle 120, the second nozzle 122, and the third nozzle 130 are integral with the rest of the bracket 108.

Figure 5:
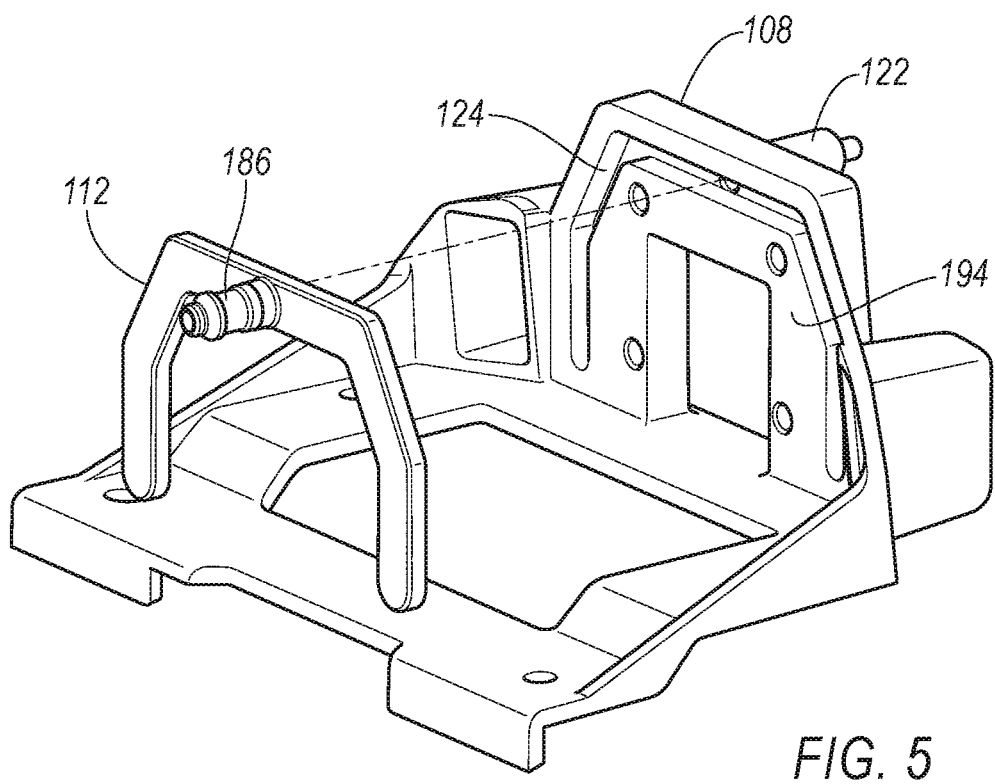
FIG. 5 is a rear perspective exploded view of the bracket and the channel plate.

With reference to FIG. 5, the bracket 108 includes the channel 124. The bracket 108 includes a back surface 194 facing toward the vehicle 100, i.e., toward the body panel 134 to which the sensor apparatus 102 is mounted. The channel 124 extends into the back surface 194. The channel 124 is elongated from the first nozzle 120 to the second nozzle 122 and from the second nozzle 122 to the third nozzle 130. The channel 124 can be shaped like a groove with a constant cross-sectional shape perpendicular to a path of elongation, e.g., with a constant width along the back surface 194 and depth into the back surface 194.

The channel 124 is fluidly connected to the first nozzle 120, to the second nozzle 122, and to the third nozzle 130. For the purposes of this disclosure, "A and B are fluidly connected" means that fluid can freely flow between A and B. In particular, the first nozzle 120, the second nozzle 122, and the third nozzle 130 are open to the channel 124. The channel 124 fluidly connects the first nozzle 120, the second nozzle 122, and the third nozzle 130 to each other.

Figure 6:
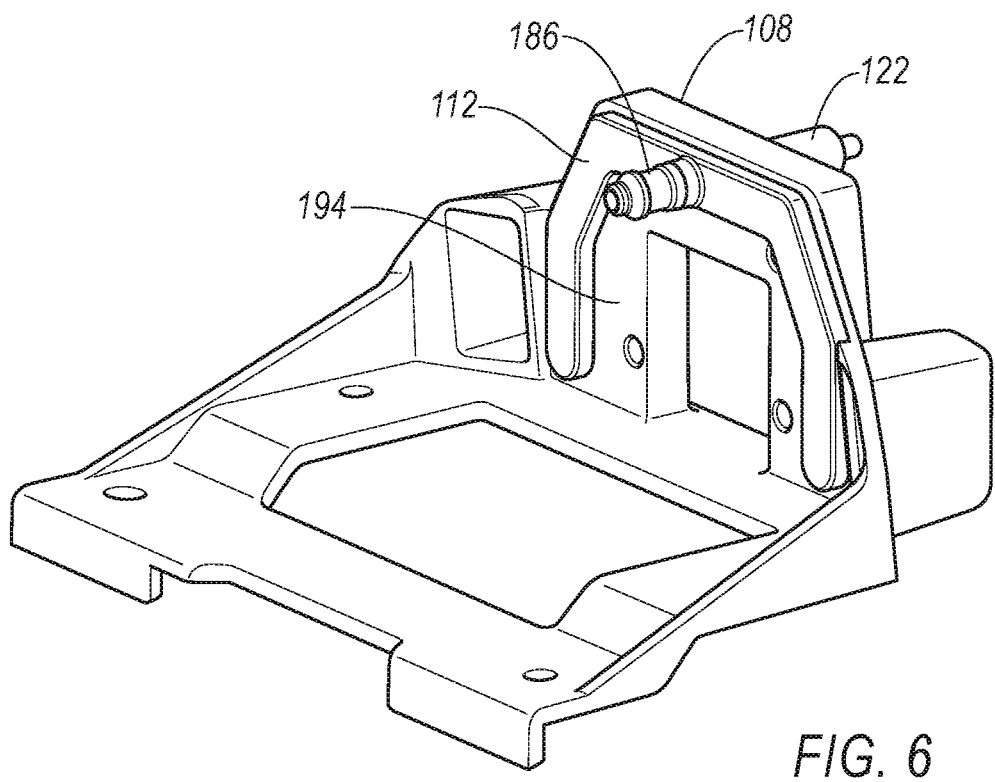
FIG. 6 is a rear perspective view of the bracket and the channel plate.

With reference to FIGS. 5 and 6, the channel 124 is sealed except for an inlet 186, the first nozzle 120, the second nozzle 122, and the third nozzle 130. In particular, the channel plate 112 includes the inlet 186 and sealingly covers the channel 124. The channel plate 112 is elongated following the path of elongation of the channel 124. The channel plate 112 has a constant width along the path of elongation slightly greater than the width of the channel 124. The channel plate 112 has a constant thickness. The channel plate 112 is fixed to the bracket 108, e.g., by ultrasonic welding, which can reduce dimensional stackup compared with other methods of attachment.

The channel plate 112 includes the inlet 186. The inlet 186 is fluidly connected to the channel 124, e.g., by being open to the channel 124 through the channel plate 112, and the inlet 186 is thereby fluidly connected to the first nozzle 120, the second nozzle 122, and the third nozzle 130. A hose 196 (shown in FIG. 3) is attached to the inlet 186 in the chamber 180. The single hose 196 can supply the first nozzle 120, the second nozzle 122, and the third nozzle 130, saving space in the chamber 180 and permitting a compact design for the sensor apparatus 102. The inlet 186 is positioned at a midpoint of the channel plate 112 across which the channel plate 112 is symmetrical. The inlet 186 is aligned with the second nozzle 122. This position of the inlet 186 minimizes the distance along the channel 124 from the inlet 186 to the first nozzle 120 and to the third nozzle 130.

Figure 7:
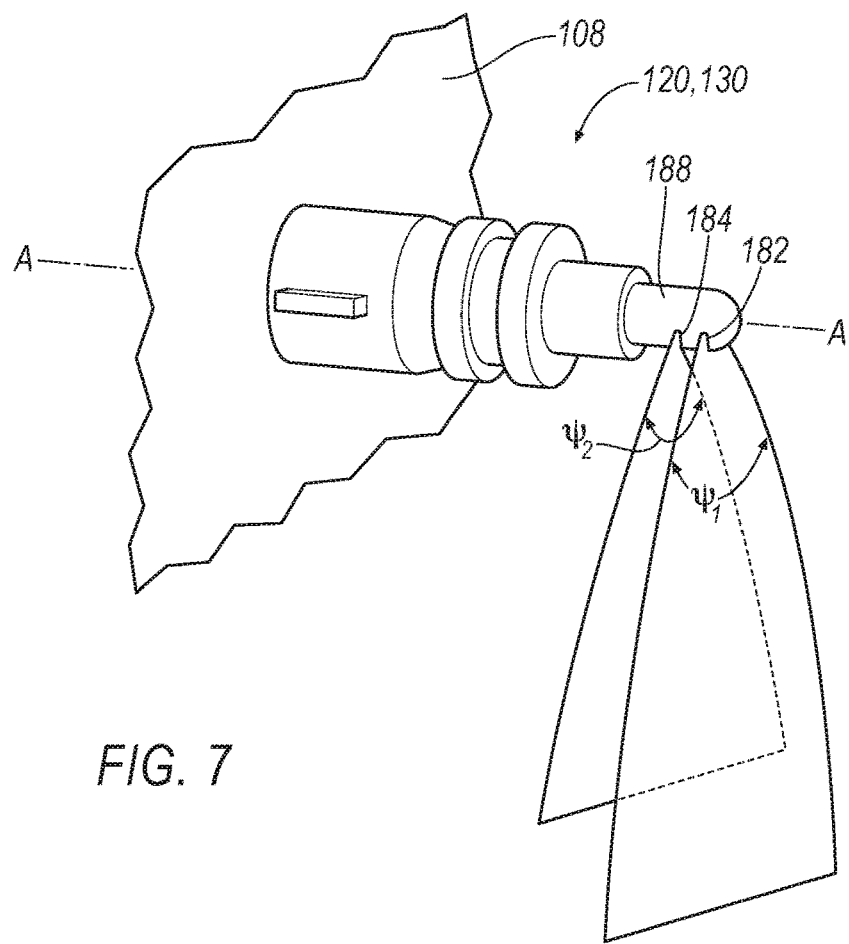
FIG. 7 is a perspective view of a nozzle of the bracket.
Figure 8:
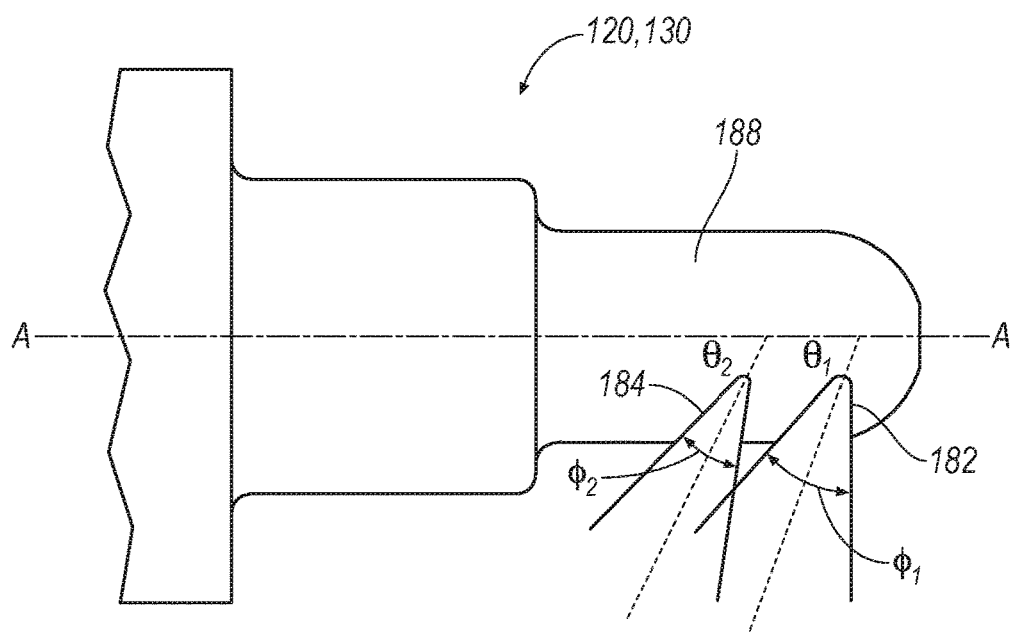
FIG. 8 is a side view of the nozzle.

With reference to FIGS. 7 and 8, the first nozzle 120 and third nozzle 130 each include a cylindrical section 188. The cylindrical section 188 for each of the first nozzle 120 and third nozzle 130 includes the first orifice 182 and the second orifice 184. Each cylindrical section 188 defines an axis A transverse to the plane defined by the rectangular shape of the respective first sensor window 114 or third sensor window 128.

Each of the first nozzle 120 and third nozzle 130, specifically each cylindrical section 188, includes the first orifice 182 and the second orifice 184. The first orifice 182 and the second orifice 184 for each cylindrical section 188 are spaced from each other along the axis A. The first orifice 182 is farther from the respective first sensor window 114 or third sensor window 128 along the axis A than the second orifice 184 is. The first orifice 182 and the second orifice 184 for each cylindrical section 188 are aimed in the same radial direction relative the axis A, e.g., downward.

The first orifice 182 and second orifice 184 are each shaped to emit a spray pattern having a deflection angle $\varphi$ and a spray angle $\psi$. The spray angle $\psi$ is an angular width of the spray measured circumferentially around the axis A. The spray angles $\psi_1$, $\psi_2$ of the first orifice 182 and second orifice 184 can be the same or approximately the same, e.g., 81°. The deflection angle $\varphi$ is an angular thickness measured perpendicular to the spray angle $\psi$. The deflection angle $\varphi_1$ for the first orifice 182 can be greater than the deflection angle $\varphi_2$ for the second orifice 184. For example, the deflection angle $\varphi_1$ for the first orifice 182 can be approximately 42°, and the deflection angle $\varphi_2$ for the second orifice 184 can be approximately 36°. The first orifice 182 and second orifice 184 each have a direction of discharge directed along a center of the spray pattern, i.e., bisecting the spray angle $\psi$ and bisecting the deflection angle . The direction of discharge of the first orifice 182 forms a first acute angle $\theta_1$ with the axis A in a direction along the axis A toward the respective first sensor window 114 or third sensor window 128, and the direction of discharge of the second orifice 184 forms a second acute angle $\theta_2$ with the axis A in a direction along the axis A toward the respective first sensor window 114 or third sensor window 128. The first acute angle $\theta_1$ is greater than the second acute angle $\theta_2$, meaning that the spray pattern from the first orifice 182 can reach the first half 158 of the respective first sensor window 114 or third sensor window 128, which is farther away than the second half 160 is.

Returning to FIG. 2, each first orifice 182 is shaped to discharge onto a first region 190 of the respective first sensor window 114 or third sensor window 128, i.e., the first region 190 is the intersection of the spray pattern from the respective first orifice 182 with the respective first sensor window 114 or third sensor window 128. Each second orifice 184 is shaped to discharge onto a second region 192 of the respective first sensor window 114 or third sensor window 128, i.e., the second region 192 is the intersection of the spray pattern from the respective second orifice 184 with the respective first sensor window 114 or third sensor window 128. At least some of the first region 190, e.g., a majority of the first region 190 by area, is in the first half 158 of the respective first sensor window 114 or third sensor window 128. At least some of the second region 192, e.g., a majority of the second region 192 by area, is in the second half 160 of the respective first sensor window 114 or third sensor window 128. The first region 190 and the second region 192 can overlap each other. The multiple orifices 182, 184 in the single first nozzle 120 or third nozzle 130 can usefully cover a full length of the rectangular shape of the first sensor window 114 or third sensor window 128.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor apparatus comprising:
a first sensing device;
a third sensing device;
a sensor housing, wherein the sensor housing includes a first sensor window, a third sensor window, and a top panel, the first sensing device has a field of view through the first sensor window, and the third sensing device has a field of view through the third sensor window;
a bracket mounted on top of the top panel;
a second sensor held by the bracket and including a second sensor window; and
a channel plate fixed to the bracket;
wherein the bracket includes a first nozzle aimed at the first sensor window, a third nozzle aimed at the third sensor window, and a second nozzle aimed at the second sensor window;
the bracket includes a channel fluidly connected to the first nozzle, the third nozzle, and the second nozzle;
the channel plate covers the channel;
the channel plate includes an inlet fluidly connected to the channel; and
the channel is sealed except for the inlet, the first nozzle, the second nozzle, and the third nozzle.

2. The sensor apparatus of claim 1, wherein the inlet is aligned with the second nozzle.

3. The sensor apparatus of claim 1, wherein the channel is elongated from the first nozzle to the second nozzle and from the second nozzle to the third nozzle.

4. The sensor apparatus of claim 1, wherein the bracket is a single piece.

5. The sensor apparatus of claim 1, wherein the first nozzle includes a first orifice and a second orifice.

6. The sensor apparatus of claim 5, wherein the first orifice is shaped to discharge onto a first region of the first sensor window, and the second orifice is shaped to discharge onto a second region of the first sensor window.

7. The sensor apparatus of claim 5, wherein the first nozzle includes a cylindrical section including the first orifice and second orifice, and the cylindrical section defines an axis.

8. The sensor apparatus of claim 7, wherein the first orifice has a direction of discharge forming an acute angle with the axis in a direction along the axis toward the first sensor window.

9. The sensor apparatus of claim 8, wherein the acute angle is a first acute angle, and the second orifice has a direction of discharge forming a second acute angle with the axis in a direction along the axis toward the first sensor window.

10. The sensor apparatus of claim 9, wherein the first acute angle is greater than the second acute angle.

11. The sensor apparatus of claim 10, wherein the first orifice is spaced from the second orifice along the axis, and the first orifice is farther from the first sensor window along the axis than the second orifice is.

12. The sensor apparatus of claim 7, wherein the first sensor window has a rectangular shape, and the axis is transverse to a plane defined by the rectangular shape of the first sensor window.

13. The sensor apparatus of claim 1, further comprising a face plate including a clip, wherein the bracket includes a slot into which the clip is inserted.

14. The sensor apparatus of claim 13, wherein the face plate includes openings through which the second sensor, first nozzle, and second nozzle extend.

15. The sensor apparatus of claim 1, wherein the first sensing device is a LIDAR sensing device.

16. The sensor apparatus of claim 1, wherein the second sensor is a camera, and the second sensor window is a lens.

17. A sensor apparatus comprising:
a first sensing device;
a sensor housing, wherein the sensor housing includes a first sensor window and a top panel, and the first sensing device has a field of view through the first sensor window;
a bracket mounted on top of the top panel;
a second sensor held by the bracket and including a second sensor window; and
a channel plate fixed to the bracket;
wherein the bracket includes a first nozzle aimed at the first sensor window and a second nozzle aimed at the second sensor window;
the bracket includes a channel fluidly connected to the first nozzle and the second nozzle;
the channel plate covers the channel;
the channel plate includes an inlet fluidly connected to the channel; and
the inlet is aligned with the second nozzle.

18. The sensor apparatus of claim 17, further comprising a third sensing device, wherein the sensor housing includes a third sensor window, and the third sensing device has a field of view through the third sensor window.

19. The sensor apparatus of claim 18, wherein the bracket includes a third nozzle aimed at the third sensor window, and the channel is fluidly connected to the third nozzle.

* * * * *